United States Patent [19]

Ungerboeck

[11] Patent Number: 4,969,163
[45] Date of Patent: Nov. 6, 1990

[54] TIMING CONTROL FOR MODEM RECEIVERS

[75] Inventor: Gottfried Ungerboeck, Langnau am Albis, Switzerland

[73] Assignee: International Business Machines Corp., Armonk, N.Y.

[21] Appl. No.: 401,896

[22] Filed: Sep. 1, 1989

[30] Foreign Application Priority Data

Aug. 21, 1989 [EP] European Pat. Off. ........ 89810619.0

[51] Int. Cl.$^5$ .............................................. H03H 7/30
[52] U.S. Cl. ...................................... 375/14; 375/106
[58] Field of Search ................... 375/11, 12, 13, 14, 375/15, 18, 20, 97, 98, 96, 106; 333/18; 364/724, 754; 328/155, 162

[56] References Cited

U.S. PATENT DOCUMENTS

| | | | |
|---|---|---|---|
| Re. 31,351 | 8/1983 | Falconer ................................. | 375/12 |
| 3,943,448 | 3/1976 | Motley et al. ........................ | 375/20 |
| 3,962,637 | 6/1976 | Motley et al. ........................ | 375/14 |
| 3,978,407 | 8/1976 | Forney, Jr. et al. ................. | 375/15 |
| 4,004,226 | 1/1977 | Quresh et al. ........................ | 375/15 |
| 4,253,184 | 2/1981 | Gitlin et al. ......................... | 333/18 |
| 4,309,770 | 10/1982 | Godard ................................. | 333/18 |
| 4,313,202 | 1/1982 | Kameya ................................. | 375/11 |
| 4,343,759 | 8/1982 | Kusika et al. ........................ | 364/724 |
| 4,775,988 | 10/1988 | Chevillat et al. ..................... | 375/98 |

*Primary Examiner*—Douglas W. Olms
*Assistant Examiner*—Stephen Chin
*Attorney, Agent, or Firm*—Edward H. Duffield

[57] ABSTRACT

For a modem receiver using an adaptive equalizer with fractional tap spacing, method and apparatus are disclosed for controlling the sample-timing phase. By evaluating bandedge components of the received signal in a particular way, a timing-phase vector signal is derived which is independent of the signal energy at the bandedges and of the quality of frequency separation of the filters for the bandedge signals. After an initial period, the current timing-phase vector signal is captured and stored as a reference. Thereafter, the sampling phase of the receiver is kept at its initial random value, represented by the stored reference timing-phase vector. The necessity to initially change the sampling phase in the receiver to a value which is forced by the received signal is avoided.

8 Claims, 4 Drawing Sheets

FIG. 2 TIMING PHASE ADJUSTMENT

FIG. 3 RECEIVED COMPLEX-VALUED SIGNAL AND SAMPLES

FOR MODULATION INTERVAL n (DURATION = T): k = 2n AND k = 2n+1

FIG. 4

FIG. 5 SEQUENCING CONTROL

TIMING CONTROL FOR MODEM RECEIVERS

FIELD OF INVENTION

Present invention is concerned with timing control in modem receivers, and in particular with control of the sampling phase in a receiver comprising an adaptive equalizer whose tap spacing is a fraction of the modulation interval T.

BACKGROUND

Several methods and systems are known for controlling the sampling time in modem receivers which utilize equalizers with a tap spacing equal to the modulation interval T, or a fraction thereof. The known methods and systems were disclosed, e.g., in the following publications and patent:

(a) D.L. Lyon: "Timing Recovery in Synchronous Equalized Data Communication", IEEE Transactions on Communications, Vol. COM-23 (1975) pp. 269–274.

(b) F. G. Caron et al.: U.S. Pat. No. 4,039,748 "Method and Device for Synchronizing the Receiver Clock in a Data Transmission System".

(c) D. Godard: "Passband Timing Recovery in an All-Digital Modem Receiver", IEEE Transactions on Communications, Vol. COM-26 (1978) pp. 517–523.

(d) G. Ungerboeck: "Fractional Tap-Spacing Equalizer and Consequences for Clock Recovery in Data Modems", IEEE Transactions on Communications, Vol. COM-24 (1976) pp. 856–864.

(e) P. R. Chevillat, D. Maiwald, G. Ungerboeck: "Rapid Training of a Voice-Band Data-Modem Receiver Employing an Equalizer with Fractional-T Spaced Coefficients", IEEE Transactions on Communications, Vol. COM-35 (1987) pp. 869–876.

Three of these disclosures (a, b and c) describe schemes which employ bandpass filters to extract signal components from the bandedges of the received signal for timing control ("bandedge timing"). The average energy of the sum of the bandedge signals is a periodic function, with period T, of the sampling phase at which the bandedge signals are observed. This dependency is exploited for timing-phase control. In particular, it is argued that the sampling phase should be adjusted to a value for which the maximum bandedge energy is obtained. Equalizers with T-spaced taps achieve optimum performance for this phase.

The known schemes adjust the sampling phase only to this phase, and later maintain it at this value. The selectivity of the bandpass filters plays an important role. Furthermore, the signal power in the bandedge regions, which depends on the a priori unknown attenuation characteristics of the currently used transmission channel, acts as a multiplicative factor in the obtained phase-error measurements, and thus influences the dynamic behavior of the timing control scheme. It is desireable to have a timing control scheme which is independent of these conditions. For receivers with an equalizer, whose taps are spaced by a fraction of T (FTS equalizer), it is furthermore advantageous to have a timing control scheme which only measures the initial random sampling phase and then maintains the sampling phase at this value.

OBJECTS OF THE INVENTION

It is an object of the invention to devise a timing control scheme that is insensitive to the frequency separation of bandpass filters and whose dynamic behavior is independent of the signal power in the bandedge regions.

It is another object to provide a timing control scheme for receivers with an FTS equalizer that allows to capture an inititial random sampling phase and then to maintain the sampling phase at this value.

SUMMARY OF THE INVENTION

These objects are achieved by a timing control method and apparatus as defined in claims 1 and 4. Preferred particular embodiments of this method and of the apparatus are defined in the dependent claims.

The invention achieves the objects mainly by forming a timing-phase vector tpv, whose angle represents the current sampling phase, based on lowpass filtering the difference of the products of two complex bandpass-filter outputs obtained at T/2-spaced time instants, whereby the result becomes bias free and independent of the frequency separation of bandpass filters; and by normalizing the magnitude of tpv by an appropriate gain control for the lowpass filter such that the magnitude of tpv becomes independent of the power of the bandedge signals.

An advantage of present invention is that it allows to use simple bandpass filters with non-critical frequency separation.

A further advantage is that dynamic behavior of the disclosed timing control scheme does not depend on the attenuation characteristics of the currently used transmission channel.

Another advantage of the invention is that it allows to maintain the receiver sampling-time phase at its initial random value.

These and other advantages will become more apparent from the following description of a preferred embodiment of the invention with reference to the drawings.

DETAILED DESCRIPTION

1. Principles of receivers using equalizers with "fractionally-spaced" taps and of their timing control The disclosed timing control method is suited for modem receivers which incorporate an adaptive equalizer whose tap spacing is a fraction of one modulation interval T (FTS equalizer). Usually, the spacing is chosen equal to T/2. An FTS equalizer permits the achievement of a low mean-square error essentially independently from the sampling phase (cf. above-cited article by Ungerboeck). Hence, it is sufficient to "capture" a random sampling phase at the beginning of receiver training, and then to maintain this phase during subsequent receiver operations. The invention constitutes an efficient solution for performing these functions.

The disclosed method is particularly useful in connection with the fast start-up technique described in above-cited article by Chevillat et al., which benefits from the absence of a timing-preamble sequence and adjusts the equalizer by spectral division from a cyclic pseudo-random sequence. However, the method is equally well suited for modem receivers which are trained more conventionally by first receiving a timing-preamble sequence and then adjusting the equalizer by the slower and simpler least mean-square gradient algorithm from an equalizer training sequence.

Earlier equalizers with T-spaced taps achieve a low mean-square error only for certain sample-timing phases. Hence, it is necessary to establish a suitable sample-timing phase before the equalizer can be trained. For this purpose, usually a timing-preamble sequence is sent prior to an equalizer training sequence. From the timing-preamble sequence, the receiver recognizes the beginning of signal reception and determines the particular sampling phase at which the T-spaced equalizer is able to operate. The sampling phase must be changed to this phase before equalizer training can start. This procedure is also used in modem receivers which employ FTS equalizers to achieve better equalization, but do not fully exploit the sampling-phase independence of these equalizers.

2. Prior solution for control of the timing-phase

The disclosed timing control method of present invention is related to the scheme described in U.S. Pat. No. 4,039,748 and in the article by Godard cited above.

FIG. 3 of the Godard article illustrates a timing control scheme in which the received carrier-modulated signal is converted to a complex passband signal by a phase splitter, also referred to as a receive Hilbert filter (the obtained complex-valued "analytic" signal contains only signal components at positive frequencies). From this signal the components around the upper and lower bandedge frequencies, $f_0 + \frac{1}{2}T$ and $f_0 - \frac{1}{2}T$ Hz, where $f_0$ denotes the carrier frequency, are extracted by two complex bandpass filters. For consistency with later descriptions, let the complex output signals of these two filters be $x^U(t)$ and $x^L(t)$ (U=upper, L=lower); in the Godard article these signals are denoted $g_2(t)$ and $g_1(t)$, respectively. The imaginary part of the complex correlation product $x^U(t)\cdot\overline{x^L}(t)$, where the overbar designates a conjugate-complex value value, is formed and sampled once per modulation interval at time $nT+\tau$, where $\tau$ denotes the sampling phase. The quantity is used as a phase-error signal in the arrangement of a second-order loop which adjusts $\tau$ such that the imaginary part of the correlation product vanishes in the mean. It can be shown that this phase corresponds approximately to the sampling phase at which the maximum average energy of the sum of the bandpass filter outputs is obtained, and hence constitutes a suitable sampling phase for an equalizer with T-spaced taps.

Note that the correlation product is sampled only once per modulation interval. As will be shown later, the expectation of the correlation product takes on the form $E\{x^U(nT+\tau)\cdot\overline{x^L}(nT+\tau)\}=A'+C'exp(j2\pi\tau/T)$, where $A'$ and $C'$ are generally complex-valued quantities which depend only on the received signal spectrum and the characteristics of the bandpass filters. The exponential term indicates the dependence on the sampling phase $\tau$.

The Godard article suggests that $A'$ be zero (see Eq. (27)). However, it was found experimentally and confirmed mathematically that the quantity $A'$ does not vanish, unless ideal bandpass filters with no spectral overlap are used. If simple first- or second-order bandpass filters are employed, the value of $A'$ cannot always be neglected compared to the magnitude of $C'$. The latter depends critically on the signal power in the bandedge regions. If, owing to severe channel attenuation at the bandedges, the magnitude of $C'$ becomes small, a non-zero value of $A'$ can lead to biased phase-errors estimates and in extreme cases to completely wrong sampling-phase adjustment.

Note further that considering only the imaginary part of the above correlation product as a phase-error signal restricts the adjustment of the sampling phase to one particular value. The scheme does not allow to measure an arbitrary sampling phase. Also, since the power of the correlation products is not controlled, the effective bandwidth of the employed phase-locked loop depends on the signal power in the bandedge regions. The dynamic behavior of the phase-locked loop is thus influenced in an undesirable manner by the spectral shape of the received signal.

Finally, it should be noted that the timing control scheme described in the Godard article works equally well on a complex baseband signal obtained by shifting the passband signal in frequency to baseband by multiplication with $exp(-j2\pi f_0 t)$. The complex bandpass filters must then have their center frequencies at $+\frac{1}{2}T$ and $-\frac{1}{2}T$, respectively.

3. Receiver front-end functions to obtain a complex baseband signal

For the disclosed timing control method it is assumed that the receiver front-end functions convert a received real-valued carrier-modulated signal $$x_0(t) = Re\left\{\sum_i a_i h(t - iT)\, e^{j2\pi f_0 t}\right\} + w_0(t) \quad (1)$$

to a sampled version of the complex baseband signal $$x(t) = \sum_i a_i h(t - iT) + w(t). \quad (2)$$

In Eqs (1) and (2), the quantities $a_i$ represent modulation symbols from a set of generally complex-valued discrete amplitudes; the signal element $h(t)$ describes the overall complex-baseband response of the transmission system up to the inputs of the equalizer and the timing-control scheme; and $w_0(t)$ and $w(t)$ denote additive noise signals which are neglected in the remaining discussions. The baseband signal is sampled at rate T/2 with sampling phase $\tau$:

$$x_k(\tau)=x(kT/2+\tau). \quad (3)$$

During the n-th modulation interval, samples $x_{2n}(\tau)$ and $x_{2n+1}(\tau)$ enter the equalizer delay line, and are also used as input to the timing control scheme.

The sequence of symbols $\{a_i\}$ is either a random data sequence with the property $$E\{a_i \overline{a_{i+m}}\}=E_s\delta_m, \quad (4)$$

where $E_s$ represents the average symbol energy and $\delta_m$ denotes the Kronecker delta function, or during start-up a suitable sequence of training symbols.

4. Realization of the invention

Figure 1:
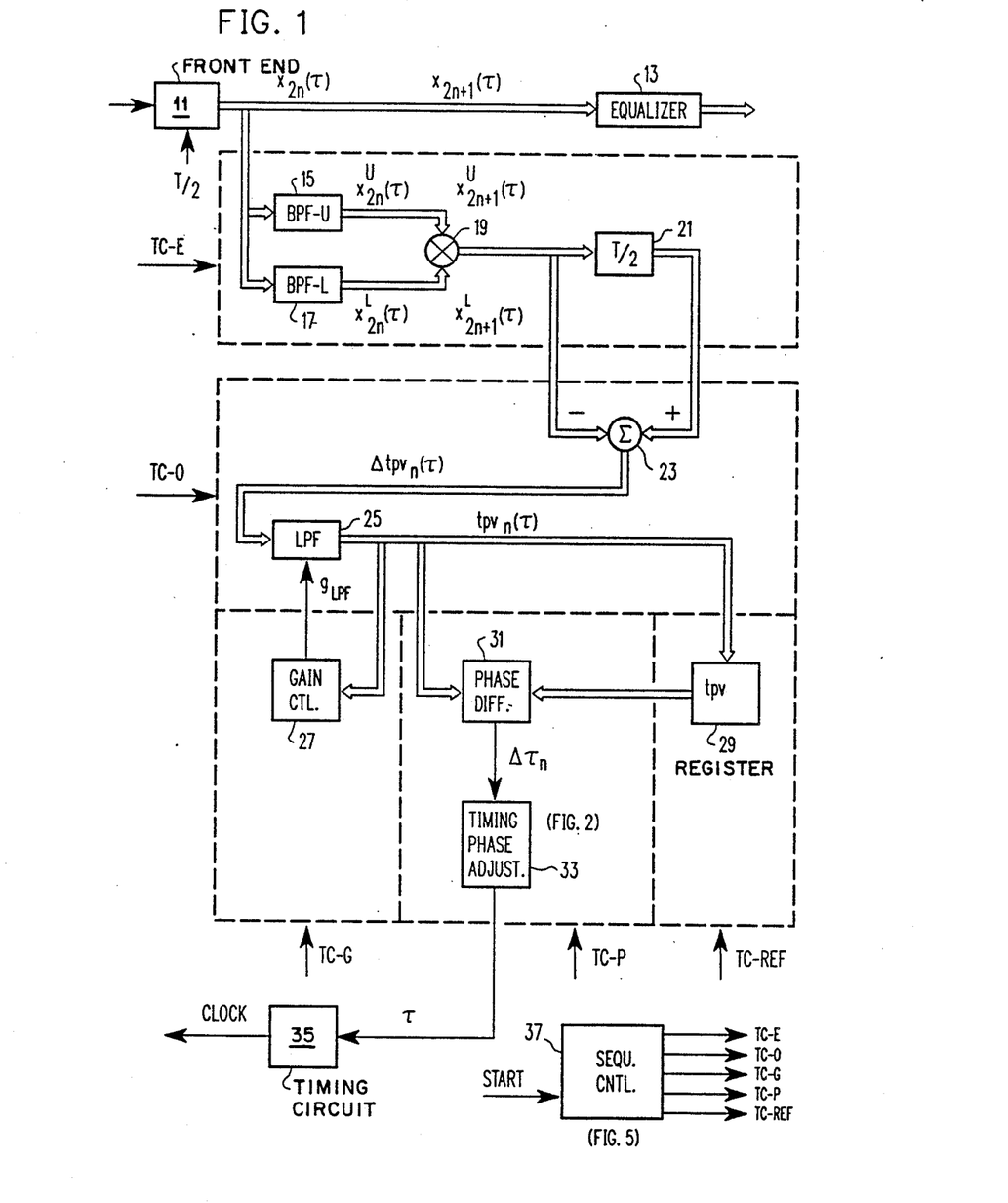
FIG. 1 is a block diagram of circuitry for timing-control scheme according to the invention.

FIG. 1 shows a block diagram of a realization of the invention. The arrangement comprises the following components:

receiver front-end elements (11) for converting the received carrier-modulated signal to a sampled complex-baseband signal (not part of the invention);

an adaptive equalizer (13) with fractionally-spaced taps (not part of the invention);

two complex bandpass filters BPF-U (15) and BPF-L (17) with center frequencies at $f = \pm \frac{1}{2}T$. (For an alternative realization of the invention with a passband signal, these frequencies should be changed to $f = f_0 \pm \frac{1}{2}T$.)

a multiplier element (19) for forming a correlation product of the output signals of the two bandpass filters;

a T/2 delay element (21) and a subtracting element (23) for forming differences of subsequent products furnished by the multiplier (19);

a lowpass filter LPF (25) with a gain control element (27), connected to the output of the subtracting element, furnishing at its output a timing-phase vector;

a register or storage unit (29) for holding a timing-phase vector reference value; this register is loaded at a particular time (TC-REF) after the beginning of signal reception with the then current value of the timing-phase vector signal furnished by the LPF (25);

a phase-error generating element (31) for measuring a phase difference between the timing-phase vector values furnished by the low pass filter (25) and the reference register (29);

a timing-phase adjusting element (33) for forming a new timing phase in response to a previous timing phase and the current phase error;

timing means (35) comprising an oscillator or equivalent means, for generating a clock signal whose phase is controlled by the adjusting elemt (33); and a sequencing control unit (37) which furnishes several sequencing control signals (TC-E, TC-O, TC-G, TC-P, TC-REF) for determining the sequence in which the different units of the arrangement are active.

The two bandpass filters BPF-U and BPF-L extract from the baseband signal the components in the upper and lower roll-off regions, i.e., around the Nyquist frequencies $+\frac{1}{2}T$ and $-\frac{1}{2}T$. The BPF outputs $x_{2n}{}^U(\tau)$, $x_{2n+1}{}^U(\tau)$ and $x_{2n}{}^L(\tau)$, $x_{2n+1}{}^L(\tau)$ are pairwise correlated and the difference betweeen the two T/2-spaced correlation products is formed. The expectation of this difference exhibits the desired bias-free form C exp$(j2\pi\tau/T)$, even if the bandpass filter exhibit non-negligible spectral overlap. Hence, simple single-pole BPF's can be employed.

Lowpass filtering of the difference of the correlation product greatly reduces short-term fluctuations. Hence the timing-phase vector tpv$_n(\tau)$ obtained at the output of the LFP filter will closely resemble the expectation of the input signal.

The magnitude of the timing-phase vector is controlled by an algorithm which scales the LPF input gain $g_{LPF}$ and the output tpv$_n(\tau)$ such that $|\text{tpv}_n(\tau)|$ remains close to the unit radius.

The phase error $\Delta\tau_n$ representing the phase difference between tpv$_n(\tau)$ and the reference timing-phase vector tpv$_{REF}$ is computed, and used to control the sampling phase $\tau$. Since under normal conditions phase differences remain small and the magnitudes of the timing-phase vectors are approximately normalized, the phase difference arg{tpv$_n(\tau)$} − arg{tpv$_{REF}$} is well approximated by $$\Delta\tau_n = Im\{tpv(\tau)_n \overline{tpv}_{ref}\}. \qquad (5)$$

Figure 2:
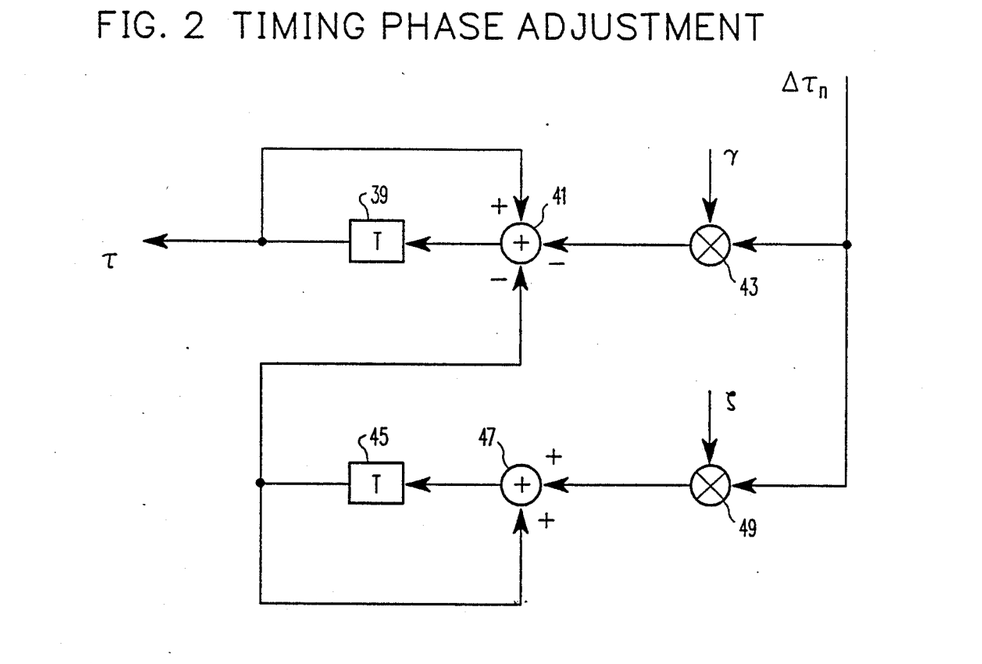
FIG. 2 shows in more detail the timing-phase adjustment means of FIG. 1.
Figure 3:
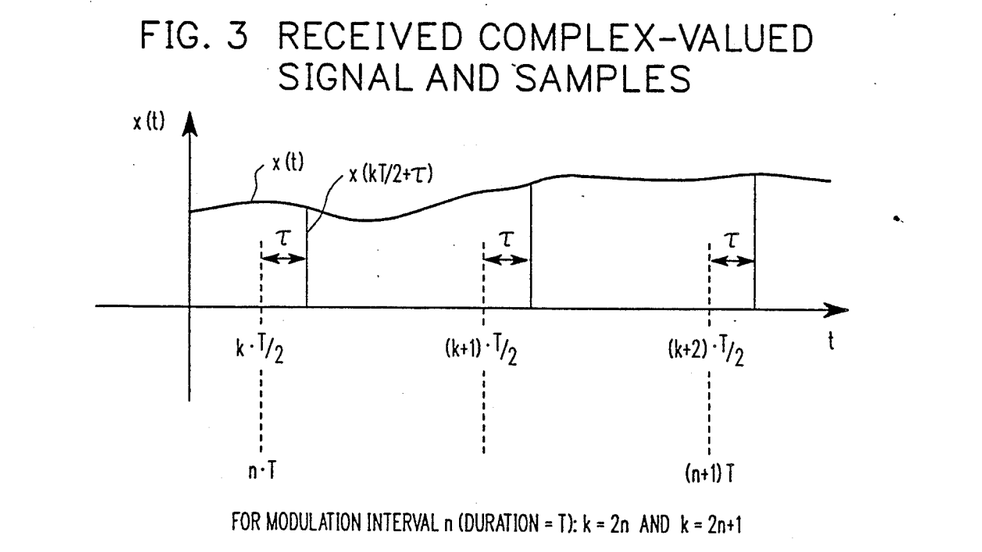
FIG. 3 illustrates for a section of a received signal the relation between modulation interval, sampling intervals, and sampling phase.
Figure 4:
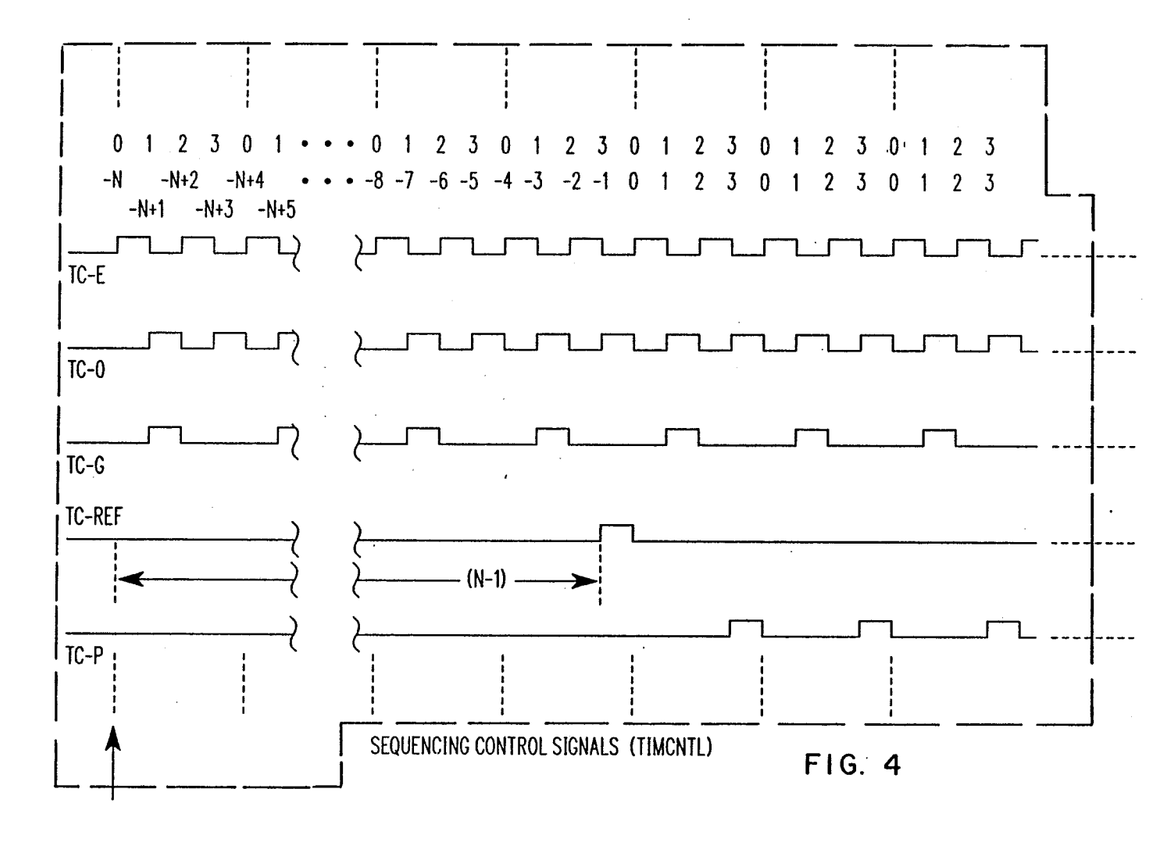
FIG. 4 is a time diagram of the control signals furnished by the sequencing control unit of FIG. 1.

The objective of timing-phase adjustments is the control the sampling phase $\tau$ such as to minimize the phase error $\Delta\tau_n$. With the adjustments $$\tau \leftarrow \tau - \gamma\Delta\tau_n - \Delta\tau_{s,n}, \qquad (6a)$$

$$\Delta\tau_{s,n+1} = \Delta\tau_{s,n} + \zeta\Delta\tau_n, \qquad (6b)$$

illustrated in FIG. 2, the function of a second-order phase-locked loop (PLL) is achieved. The quantities $\gamma(>0)$ and $\zeta(>0)$ are the first- and second-order loop gains, and $\Delta\tau_{s,n}$ represents the estimated timing drift per modulation interval between the timing of the received signal and the free-running receiver timing. The timing-phase adjustment arrangement shown in FIG. 2 comprises delay element 39, adding means 41, and multiplying means 43, constituting the first-order part of the PLL; and further comprises delay element 45, adding means 47, and multiplying means 49, constituting the second-order part of the PLL.

The principle purpose of the sequencing control unit is to operate the disclosed scheme first in "capture" mode, during which the timing-phase vector settles to a valid value, then to store this value as the reference timing-phase vector, and finally control the sampling phase such that phase represented by the reference vector is maintained. Additional functions are described later.

5. More details on the timing-control operation
Bandpass Filters

The bandpass filters BPF-U and BPF-L operate at sampling rate 2/T. Their transfer functions are conveniently described by $$S^U(f) = S(f - \tfrac{1}{2}T), \quad S^L(f) = S(f + \tfrac{1}{2}T), \qquad (7)$$

where $$S(f) = \frac{g_B}{1 - \rho_B \exp(-j2\pi fT/2)} = S(f + 2m/T), \quad m, \qquad (8)$$

denotes the transfer function, with period 2/T, of an equivalent time-discrete single-pole lowpass filter. Appropriate values for $\rho_B$ are in the range between 7/8 and 15/16. With $g_B = 1 - \rho_B$, the BPF's achieve unit gain at their center frequencies.

Consecutive BPF output signals are computed by the recursions $$X_k{}^U = +j\rho_B X_{k-1}{}^U + g_B X_k(\tau), \qquad (9a)$$

$$X_k{}^L = -j\tau_B X_{k-1}{}^L + g_B X_k(\tau), \qquad (9b)$$

which are executed first for k=2n, and then for k=2n+1.

Properties of the correlation products

For the following derivation, it is assumed that a random sequence $\{a_i\}$ characterized by (4) is transmitted, and that the bandwidth of the received signal is less than twice the modulation rate, i.e., H(f) and H(f+1/T) exhibit no spectral overlap for $|1| \geq 2$, where H(f) is the Fourier transform of the signal element h(t). The signal elements obtained from h(t) at the output of the bandpass filters BPF-U and BPF-L are denoted $h^U(t)$ and $h^L(t)$, with Fourier transforms $$H^U(f) = H(f)S(f - \tfrac{1}{2}T), H^L(f) = H^L(f) = H(f)S(f + \tfrac{1}{2}T). \qquad (10)$$

The expectation of correlation products $X_{2n+m}{}^U \overline{X}_{2n+m}{}^L$, for $m=0,1$, is obtained as follows:

$$E\{X_{2n+m}^U \cdot \overline{X}_{2n+m}^L\} = \tag{11}$$

$$= E\left(\sum_i a_i h^U[(2n - 2i + m)T/2 + \tau] \sum_{i'} \overline{a_{i'} h^L}[(2n - 2i' + m)T/2 + \tau]\right)$$

$$\mp E_s \sum_i h^U[(2i + m)T/2 + \tau]\overline{h^L}[(2i + m)T/2 + \tau]$$

$$= E_s \int_{-\infty}^{+\infty} \int_{-\infty}^{+\infty} H^U(f)\overline{H^L}(f') e^{j2\pi(f-f')(\tau+mT/2)} \sum_i e^{j2\pi(f-f')iT} df\, df'$$

$$= \frac{E_s}{T} \sum_l \int_{-\infty}^{+\infty} H^U(f)\overline{H^L}(f - l/T) e^{j2\pi l(\tau+mT/2)T} df.$$

Substitution of Eq. (10) and observing that the integrals are zero for $|l| \geq 2$ and negligible for $l = -1$, yields $$E\{X_{2n+m}^U \cdot X_{2n+m}^L\} = \tag{12}$$

$$\frac{E_s}{T} \int_{-\infty}^{+\infty} S(f - \tfrac{1}{2}T)|H(f)|^2 \overline{S}(f + \tfrac{1}{2}T) df +$$

$$\frac{(-1)^m E_s}{T} \int_{-\infty}^{+\infty} H(f - \tfrac{1}{2}T)|S(f)|^2 \overline{H}(f + \tfrac{1}{2}T) df\, e^{j2\pi\tau/T} =$$

$$A' + (-1)^m C' e^{j2\pi\tau/T}.$$

It can be seen that $A'$ is zero only if the bandpass filters provide complete spectral separation, i.e., $S(f-\tfrac{1}{2}T)\overline{S}(f+\tfrac{1}{2}T)=0$, and that the magnitude of $C'$ depends strongly on the signal power in the bandedge regions around $\pm\tfrac{1}{2}T$.

Taking the difference of two $T/2$-spaced correlation products leads to the expectation $$E\{X_{2n}^U X_{2n}^L - X_{2n+1}^U X_{2n+1}^L\} = Ce^{j2\pi\tau/T}, C = 2C', \tag{13}$$

in which the undesired bias quantity $A'$ is eliminated.

Timing-Phase Vector

The timing-phase vector is obtained by the recursive lowpass filter operation $$tpv_n(\tau) = \rho_{LPF} tpv_{n-1}(\tau) + g_{LPF}[X_{2n}^U X_{2n}^L - \overline{X}_{2n+1}^U X_{2n+1}^L]. \tag{14}$$

An appropriate value for $\rho_{LPF}$ is 127/128.

Magnitude Control of the Timing-Phase Vector

The magnitude of $tpv_n(\tau)$ is continuously monitored. If it deviates from the unit radius by more than a specified amount, e.g., $\pm 5\%$, the LPF gain $g_{LPF}$ and $tpv_n(\tau)$ are scaled instantly, provided $g_{LPF}$ does not exceed a maximally allowed value $g_{LPFmax}$. The following algorithm performs this function:

$$\Delta = |tpv_n(\tau)|^2 - 1 \tag{15a}$$

$$\alpha = 1 - \Delta/4 \tag{15b}$$

If $|\Delta| > 0.1$ and $\alpha g_{LPF} \leq g_{LPFmax}$ then:

$$g_{LPF} \leftarrow \alpha g_{LPF}, \quad tpv_n(\tau) \leftarrow \alpha tpv_n(\tau). \tag{15c}$$

6. Summary of problems solved by the invention

Essential features of the invention disclosed above are as follows (equations are simplified and denoted by Roman numerals):

First feature: Bias-free correlation term

The output signals of the upper and lower bandpass filters are sampled twice per modulation interval. The samples are denoted $$X_{2n}^U = X^U(nT+\tau), \quad X_{2n+1}^U = X^U(nT+T/2+\tau) \tag{1a}$$

and $$X_{2n}^L = X^L(nT+\tau), \quad X_{2n+1}^L = X^L(nT+T/2+\tau), \tag{1b}$$

for the upper and lower bandpass filters, respectively. A correlation term consisting of the difference of two correlation products is used:

$$\Delta tpv_n(\tau) = X_{2n}^U(\tau)\overline{X}_{2n}^L(\tau) - \overline{X}_{2n+1}^U(\tau)X_{2n+1}^L(\tau). \tag{11}$$

The expectation of this new correlation term, given by Eq. (13) above, takes on the form $$E\{\Delta tpv_n(\tau)\} = Ce^{j2\pi\tau/T}. \tag{III}$$

The exact circular dependence on the sampling phase is obtained without requiring bandpass filters with strong frequency separation. Hence, the use of first-order complex bandpass filters with a single imaginary-valued pole is sufficient.

Second feature: Lowpass filtering and power control

The variance of the correlation term given by Eq.(11) is significantly reduced by lowpass filtering. The resulting complex signal is called "timing-phase vector" and obtained by $$tpv_n(\tau) = \rho_{LPF} tpv_{n-1}(\tau) + g_{LPF}\Delta tpv_n(\tau), \tag{IV}$$

where $\rho_{LPF}$ represents a real-valued pole close to, but smaller than unity.

The gain $g_{LPF}$ and the magnitude of the timing-phase vector are almost instantly adjusted by a mechanism described above, such that the timing-phase vector remains close to a value on the unit circle. In this this way, the timing-phase vector is essentially made independent of the signal power in the bandedge regions of the received signal. Its angle represents the currently estimated sampling phase.

Third feature: Capturing the initial sampling phase

At the beginning of receiver training, the timing control scheme operates in capture mode. The timing-phase vector is updated according to Eq.(IV), but its value is not yet used for sampling-phase control. When the time interval specified for the capture mode elapses, the current value of the timing-phase vector is stored as a "reference timing-phase vector", $tpv_{REF}$. Its angle represents the sampling phase to be maintained during subsequent receiver operations.

During the capture period, which extends typically over N = 100...300 modulation intervals, the sampling phase of the receiver can drift relative to the phase of the received signal. However, with a maximum rate uncertainty of $10^{-4}$, as specified by CCITT, the effect of this drift is negligible.

Fourth feature: Sampling-phase tracking

During the subsequent tracking mode, updating of the timing-phase vector by Eq.(IV) continues. From the current timing-phase vector and the stored reference timing-phase vector, the phase error is computed:

$$\Delta \tau_n = Im\{tpv_n(\tau)\overline{tpv}_{REF}\}. \quad (V)$$

Eq.(V) yields a good approximation of the actual phase difference, because the magnitudes of the timing-phase vectors are controlled and phase differences are normally small.

The phase error $\Delta \tau_n$ is used to control the sampling phase $\tau$ according to the principles of a phase-locked loop. In the implementation of the disclosed timing control scheme, a second-order loop should be realized to cancel rate-offset between the rate of the received signal and the free-running receiver timing. The dynamics of the phase-locked loop can precisely be determined, because the employed phase errors do not depend on the signal power in the bandedge regions.

7. Additional feature: Performing functions at reduced rate

The bandwidth of all signals after the bandpass filters is small compared to the modulation rate. Hence, operations can be executed at a lower sampling rate without significant loss in performance. This permits the achievement of significant savings in the processing power required to realize the timing control scheme with a digital signal processor.

A sequencing of operations is suggested using a sequencing control unit (37 in FIG. 1; and FIG. 5) comprising a counter (TIMCNTL) which is incremented after each modulation interval. When the beginning of signal reception is detected, the counter is initialized to a negative value -N, where N is the capture period. When non-negative values are reached, the counter is limited to count modulo 4. Thus, TIMCNTL assumes values $-N, -N+1, \ldots -1, 0, 1, 2, 3, 0, 1, 2, 3, 0, 1, \ldots$ After initialization, the following functions are performed:

(1) TIMCNTL = even (TC-E): two consecutive output values for each of the two bandpass filters are computed. To compute these values without performing recursive filter operations for TIMCNTL = odd, the recursions $$X^U_{2n} = +j\rho_B\{+j\rho_B[+j\rho_B X^U_{2n-3} + g_B X_{2n-2}(\tau)] + g_B X_{2n-1}(\tau)\} + g_B X_{2n}(\tau) \quad (VIa)$$

$$= -j\rho_B^3 X^U_{2n-3} - \rho_B^2 g_B X_{2n-2}(\tau) + j\rho_B g_B X_{2n-1}(\tau) + g_B X_{2n}(\tau),$$

$$X^U_{2n+1} = +j\rho_B X^U_{2n} + g_B X_{2n+1}(\tau), \quad (VIb)$$

$$X^L_{2n} = -j\rho_B\{-j\rho_B[-j\rho_B X^L_{2n-3} + g_B X_{2n-2}(\tau)] + g_B X_{2n-1}(\tau)\} + g_B X_{2n}(\tau) \quad (VIIa)$$

$$= +j\rho_B^3 X^L_{2n-3} - \rho_B^2 g_B X_{2n-2}(\tau) - j\rho_B X_{2n-1}(\tau) + g_B X_{2n}(\tau),$$

$$X^L_{2n+1} = -j\rho_B X^L_{2n} + g_B X_{2n+1}(\tau) \quad (VIIb)$$

are used.

(2) TIMCNTL = odd (TC-O): the timing-phase vector is updated. Notice that this corresponds to replacing in Eq.(14) $tpv_{n-1}(\tau)$ by $tpv_{n-2}(\tau)$. Additional functions depend on a closer inspection of TIMCNTL.

If TIMCNTL mod = 1(TC-G), the magnitude of the current timing-phase vector is controlled and the gain $g_{LPF}$ is adjusted accordingly.

If TIMCNTL mod 4 = 3 and TIMCNTL < -1 no further functions are performed. If TIMCNTL = -1, $tpv_n(\tau)$ is copied into $tpv_{REF}$. If TIMCNTL > 0(TC-P), the phase error is computed from $tpv_n(\tau)$ and $tpv_{REF}$ and the phase-locked loop functions are performed. This results in adjusting the phase of a receiver-timing oscillator, or equivalent timing means (e.g., programmable timer interrupts or signal interpolation), at rate ¼.

The sequencing control (37 in FIG. 1; and FIG. 5) comprising counter TIMCNTL distributes the processing load required for the above functions evenly among consecutive modulation intervals.

Figure 5:
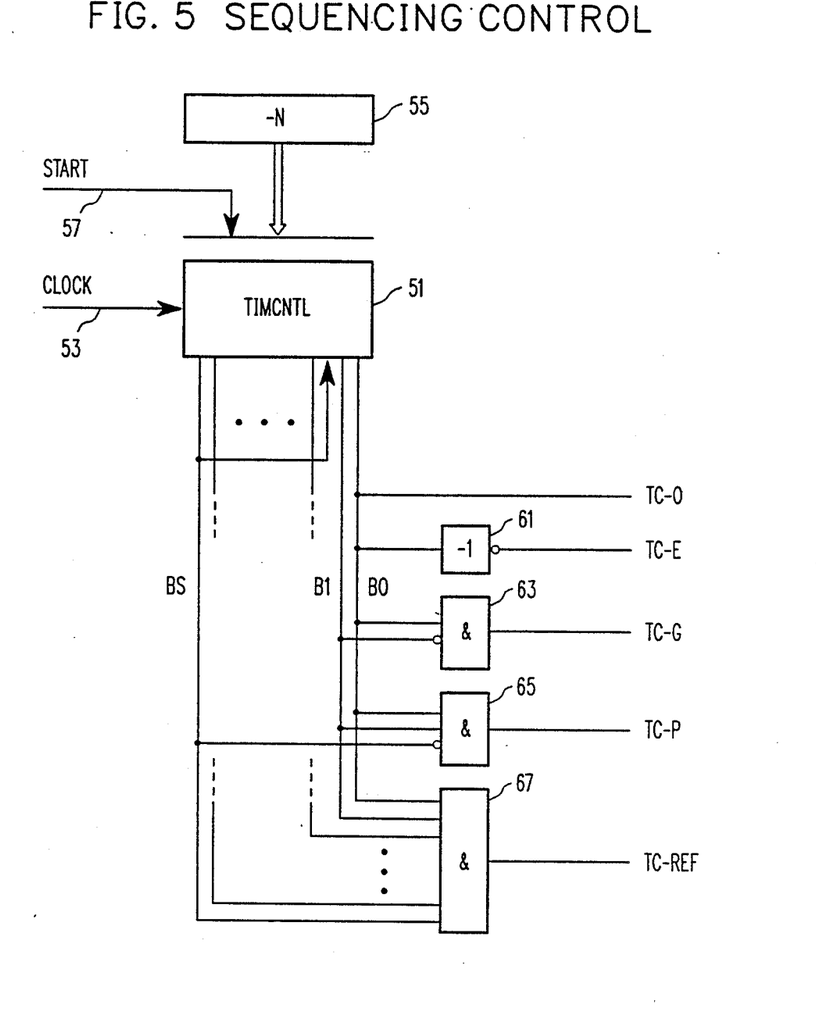
FIG. 5 is a block diagram of circuitry generating the sequencing control signals shown in FIG. 4.

An implementation of the sequencing control means 37 is shown in FIG. 5. It comprises the counter TIMCNTL (51) which is incremented by the modulation interval clock (53). Output lines B0, B1, and BS represent the least significant bit (B0), the next-to-least significant bit (B1), and the most significant sign bit (BS). Using two's complement number representation, negative values of TIMCNTL are represented by BS = 1. If TIMCNTL reaches non-negative values, BS changes to 0 and forces modulo-4 counting (... 0, 1, 2, 3, 0, 1, ...) by preventing carries from B1 to the next-significant bit.

A number -N, determining the length of the capture period, is stored in a register (55) and loaded into the counter when a START signal (57) becomes active, indicating the beginning of receiver training.

Sequencing control signals TC-E, TC-O, TC-G, TC-P, and TC-REF are obtained as follows. B0 is connected to an inverter 61 to produce TC-E, representing even counter contents. B0 is gives directly TC-O, indicating odd counter contents. B0 and the complement of B1 are combined in AND gate 63 to form TC-G, which becomes active whenever B1, B0, are 0, 1, (TIMCNTL = 1 mod 4). B0, B1, and the complement of BS are combined in AND gate 65 to form TC-P, which becomes active whenever BS, B1, B0 are 0, 1, 1(TIMCNTL = 3 mod 4, TIMCNTL > 0). All counter bits are combined in AND gate 67 to form TC-REF, which becomes active when all counter bits are 1's (TIMCNTL = -1).

I claim:

1. Method of estimating and controlling the sample-timing phase $\tau$ in a receiver for synchronous data communication, said receiver converting a received carrier-modulated signal into a sampled complex-valued signal $x(kT/2\tau) = x(k, \tau)$, with two samples $x(2n, \tau)$ and $x(2n=1\tau)$ in the n-th modulation interval where n is the current number of sequential modulation intervals T, said sampled signal being furnished to an adaptive equalizer with T/2-spaced taps; said method comprising the steps of:

obtaining from the sampled signal $x(k,\tau)$ two complex-valued narrow-band signals $x^U(k, \tau)$ and $x^L(k, \tau)$ by bandpass filters with center frequencies at an upper and a lower bandedge frequency, respectively;

forming complex-valued correlation products $x^U(k, \tau) \overline{x^L(k, \tau)}$, where the overbar denotes taking conjugate-complex values; and evaluating said correlation products for estimating and controlling the sample-timing phase $\tau$;

characterized by the following further steps:

forming differences between pairs of correlation products, one obtained at a sampling time with even index k and the other at a sampling time with odd index k, to create a complex-valued correction signal $\Delta \text{tpv}_n$;

lowpass filtering said correction signal to generate a timing-phase vector signal $\text{tpv}_n$;

performing said lowpass filtering with gain control so that the magnitude of the timing-phase vector signal $\text{tpv}_n$ remains close to a known value;

storing at a given time instant after the beginning of signal reception the current value of said timing-phase vector signal as reference timing-phase vector $\text{tpv}_{REF}$;

thereafter, obtaining at regular intervals a phase-error signal $\Delta \tau_n$ corresponding to the difference between the phase values reflected in the current timing-phase vector signal and the stored reference timing-phase vector; and using said phase-error signal $\Delta \tau_n$ to control the sampling phase $\tau$ of the sample-timing means in said receiver such that the sample-timing phase remains close to the sample-timing phase reflected in the stored reference timing-phase vector $\text{tpv}_{REF}$.

2. Method in accordance with claim 1, the method being executed in alternating first and second modulation intervals, comprising:

performing said steps of forming two narrow-band signals, and of forming correlation products, in said first modulation intervals only; and performing said steps of forming differences between pairs of correlation products, and of lowpass filtering, in said second modulation intervals only.

3. Method in accordance with claim 2, comprising the further step of:

generating time control signals in response to a signal indicating start of signal reception and to a modulation interval clock signal;

two of said time control signals being said two sequencing control signals (TC-E, TC-O); and another one of said time control signals being a reference storing signal (TC-REF) occuring N-1 modulation intervals after the begin of signal reception, N being a preselected number.

4. Apparatus for controlling the sample-timing phase $\tau$ in a receiver for synchronous data communication, said receiver comprising front-end means (11) for converting a received carrier-modulated signal into a sampled complex-valued signal $x(kT/2+\tau)=x(k, \tau)$, with two samples $x(2n, \tau)$ and $x(2n+1, \tau)$ in the n-th modulation interval T, where n is the current number of sequential modulation intervals the sampled signal being furnished to an adaptive equalizer (13) with T/2-spaced taps; said apparatus comprising:

two bandpass filters (15, 17) with center frequencies at an upper and a lower bandedge frequency, respectively, for obtaining from the sampled signal $x(k, \tau)$ two complex-valued narrow-band signals $x^U(k, \tau)$ and $x^L(k, \tau)$;

multiplication means (19) receiving the outputs of said bandpass filters (15, 17) and forming complex-valued correlation products $x^U(k, \tau) . \overline{x^L(k, \tau)}$, where $\overline{x^L(k, \tau)}$ denotes the conjugate-complex signal value of $x^L(k, \tau)$;

subtracting means (21, 23) including delay means (21), receiving the output of said multiplication means (19), and forming differences $x^U(2n, \tau).\overline{x^L(2n, \tau)} - x^U(2n+1, \tau).\overline{x^L(2n+1, \tau)}$ of pairs of correlation products obtained during one modulation interval, and furnishing a complex-valued correction signal $\Delta \text{tpv}_n$ at its outputs;

lowpass filtering means (25,27) including gain control means (27), receiving said correction signal from said subtracting means, and furnishing at its output a timing-phase vector signal $\text{tpv}_n$;

reference storage means (29) for storing at a given time instant (TC-REF) after the beginning of signal reception, the current output of said lowpass filtering means (25, 27) as reference timing-phase vector $\text{tpv}_{REF}$; and phase updating means (31,33) receiving the outputs of said lowpass filtering means (25, 27) and of said reference storage means (29), and furnishing in response thereto a current phase value $\tau$ for controlling the phase of a clock signal provided by timing means (35) of the receiver.

5. Apparatus in accordance with claim 4, in which said phase updating means (31,33) comprises:

phase difference generating means (31) connected to said lowpass filtering means (25, 27) and to said reference storage means (29) for receiving said timing-phase vector signal $\text{tpv}_n$ and said reference timing-phase vector $\text{tpv}_{REF}$, respectively, and furnishing at its output a phase difference $\Delta \tau_n$; and timing phase adjustment means (33) connected to said phase difference generating means (31) for receiving said phase difference $\Delta \tau_n$, and furnishing at its output an updated phase value $\tau$ which depends on a previously furnished value of $\tau$ and the current value of said phase difference $\Delta \tau_n$.

6. Apparatus in accordance with claim 5, in which said timing-phase adjustment means (33) comprises two signal paths;

one signal path including means (39, 41, 43) for subtracting, from a previous phase value $\tau$, a first scaled version of said phase difference and a correction factor;

the other signal path furnishing said correction factor and including means (45, 47, 49) for adding, to a previous value of said correction factor, a second scaled version of said phase difference.

7. Apparatus in accordance with claim 4, further comprising sequencing control means (37, FIG. 1; FIG. 5) for generating, in response to a start signal indicating begin of signal reception and to a modulation interval clock signal, sequence control signals (TC-E, TC-O, TC-G, TC-P) for controlling the operation of different portions of said apparatus selectively at predetermined modulation intervals; and for further
generating a reference storing control signal (TC-REF) for activating said reference storage means (29) at said given time instant.

8. Apparatus in accordance with claim 7, in which said sequencing control means (37, FIG. 1, FIG. 5) generate alternating sequence control signals (TC-E, TC-O) for activating at least said bandpass filtering means (15, 17) and said multiplication means (19) on one hand, and said lowpass filtering means on the other hand, in alternating modulation intervals.

* * * * *